US012603889B2

(12) United States Patent
Lohar et al.

(10) Patent No.: US 12,603,889 B2
(45) Date of Patent: Apr. 14, 2026

(54) SYSTEM AND METHOD FOR MONITORING AND RESTRICTING ELECTRONIC COMMUNICATION IN A NETWORK BASED ON COMMUNICATION CHARACTERISTICS

(71) Applicant: BANK OF AMERICA CORPORATION, Charlotte, NC (US)

(72) Inventors: Sanjay Arjun Lohar, Charlotte, NC (US); Kyle Mayers, Charlotte, NC (US); Karen Stanek McFeeters, York, SC (US); James J. Siekman, Charlotte, NC (US); Anna Rose Burchman, Staten Island, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 324 days.

(21) Appl. No.: 18/143,309

(22) Filed: May 4, 2023

(65) Prior Publication Data

US 2024/0372863 A1 Nov. 7, 2024

(51) Int. Cl.
*H04L 9/40* (2022.01)

(52) U.S. Cl.
CPC ........ *H04L 63/102* (2013.01); *H04L 63/0876* (2013.01)

(58) Field of Classification Search
CPC .......................... H04L 63/102; H04L 63/0876
See application file for complete search history.

(56) References Cited

U.S. PATENT DOCUMENTS

| | | | | |
|---|---|---|---|---|
| 2003/0117973 A1* | 6/2003 | Thermond | .............. | H04L 63/10 |
| | | | | 370/328 |
| 2005/0110636 A1* | 5/2005 | Ghaffari | ................. | G06Q 10/06 |
| | | | | 340/572.1 |
| 2005/0266798 A1* | 12/2005 | Moloney | ............... | H04W 12/02 |
| | | | | 455/410 |
| 2007/0206231 A1* | 9/2007 | Singh | ................. | H04N 1/32117 |
| | | | | 358/496 |
| 2019/0387399 A1* | 12/2019 | Weinberg | ................ | H04L 43/04 |
| 2020/0169890 A1* | 5/2020 | Kaushik | ................ | H04W 12/12 |

* cited by examiner

*Primary Examiner* — Khoi V Le
(74) *Attorney, Agent, or Firm* — Moore & Van Allen PLLC; Nicholas C. Russell

(57) ABSTRACT

Systems, computer program products, and methods are described herein for monitoring and restricting electronic communication in a network based on communication characteristics. The method includes receiving an electronic communication from an end-point device. The method also includes identifying a potential user identity associated with the electronic communication. The potential user identity is based on one or more user identifiers associated with the electronic communication. The method further includes determining one or more restriction tags relating to the potential user identity. Each of the one or more restriction tags include a restriction to communication between the end-point device and one or more entity users. The method still further includes causing a restriction action to be executed based on determining the potential user identity has one or more restriction tags. The restriction action is at least one of a restriction notification or a communication restriction to communication with the end-point device.

14 Claims, 5 Drawing Sheets

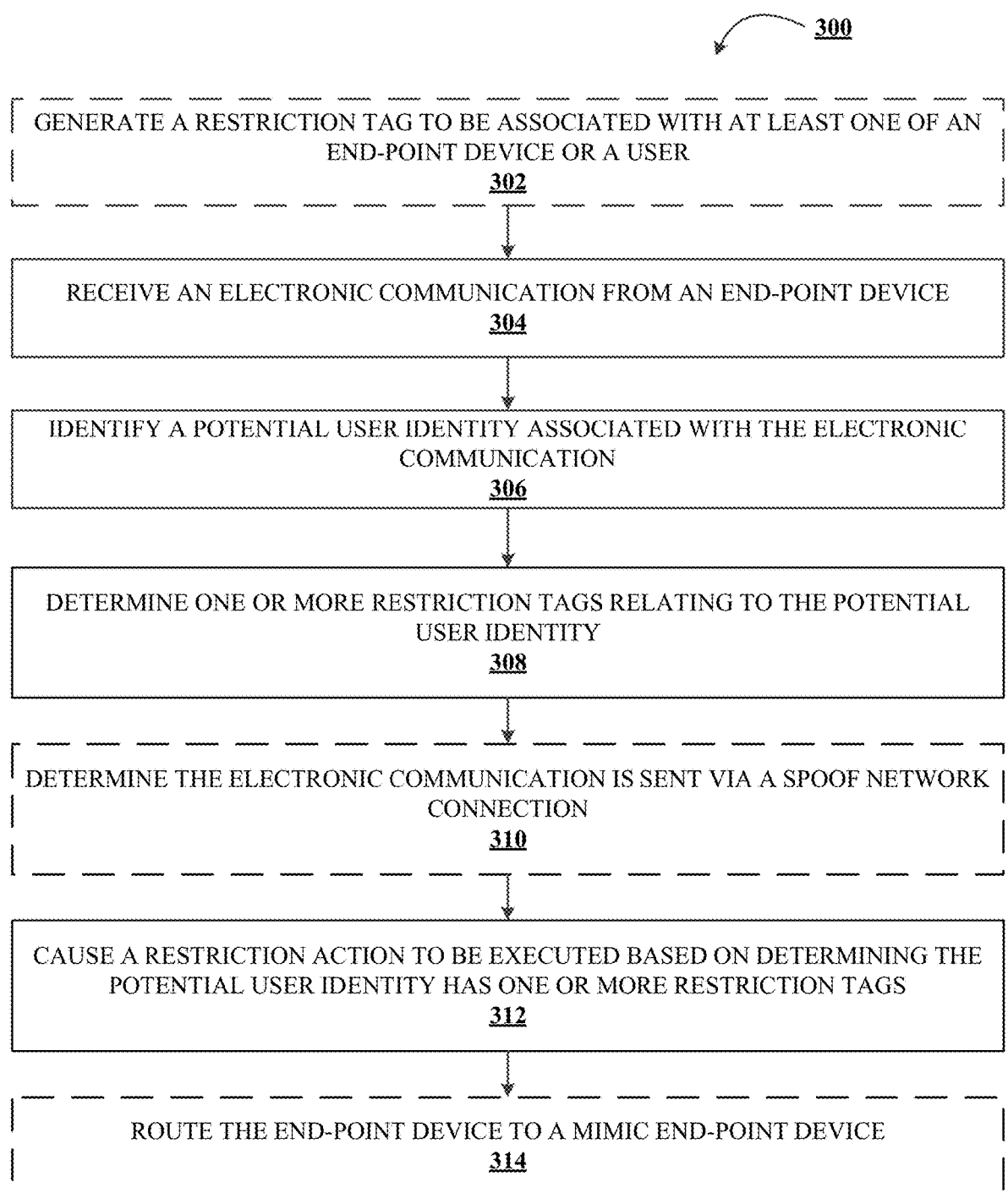

300

GENERATE A RESTRICTION TAG TO BE ASSOCIATED WITH AT LEAST ONE OF AN END-POINT DEVICE OR A USER
302

RECEIVE AN ELECTRONIC COMMUNICATION FROM AN END-POINT DEVICE
304

IDENTIFY A POTENTIAL USER IDENTITY ASSOCIATED WITH THE ELECTRONIC COMMUNICATION
306

DETERMINE ONE OR MORE RESTRICTION TAGS RELATING TO THE POTENTIAL USER IDENTITY
308

DETERMINE THE ELECTRONIC COMMUNICATION IS SENT VIA A SPOOF NETWORK CONNECTION
310

CAUSE A RESTRICTION ACTION TO BE EXECUTED BASED ON DETERMINING THE POTENTIAL USER IDENTITY HAS ONE OR MORE RESTRICTION TAGS
312

ROUTE THE END-POINT DEVICE TO A MIMIC END-POINT DEVICE
314

FIGURE 3

SYSTEM AND METHOD FOR MONITORING AND RESTRICTING ELECTRONIC COMMUNICATION IN A NETWORK BASED ON COMMUNICATION CHARACTERISTICS

TECHNOLOGICAL FIELD

Example embodiments of the present disclosure relate generally to monitoring and restricting electronic communication and, more particularly, to monitoring and restricting electronic communication in a network based on communication characteristics.

BACKGROUND

Call blocking can be difficult due to malfeasant actors masking call information and/or attempting to call people indirectly (e.g., via calling a coworker that transfers the call to the intended recipient). Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for monitoring and restricting electronic communication in a network based on communication characteristics is provided. The system includes at least one non-transitory storage device containing instructions and at least one processing device coupled to the at least one non-transitory storage device. The at least one processing device, upon execution of the instructions, is configured to receive an electronic communication from an end-point device. The at least one processing device, upon execution of the instructions, is also configured to identify a potential user identity associated with the electronic communication. The potential user identity is based on one or more user identifiers associated with the electronic communication. The at least one processing device, upon execution of the instructions, is further configured to determine one or more restriction tags relating to the potential user identity. Each of the one or more restriction tags include a restriction to communication between the end-point device and one or more entity users. The at least one processing device, upon execution of the instructions, is still further configured to cause a restriction action to be executed based on determining the potential user identity has one or more restriction tags. The restriction action is at least one of a restriction notification or a communication restriction to communication with the end-point device.

In various embodiments, the one or more user identifiers include at least one of phone number, end-point device identifier, account identifier, or network information of the end-point device. In various embodiments, the one or more user identifiers include physical characteristics of the electronic communication, and the potential user identity is determined at least in part based on the physical characteristics of the electronic communication.

In various embodiments, the restriction notification is received by an entity end-point device that received the electronic communication and the restriction notification indicates the one or more entity users associated with the one or more restriction tags. In various embodiments, the at least one processing device, upon execution of the instructions, is also configured to route the end-point device to a mimic end-point device with the mimic end-point device being configured to impersonate at least one of the one or more entity users associated with the one or more restriction tags.

In various embodiments, the at least one processing device, upon execution of the instructions, is also configured to generate a restriction tag to be associated with at least one of an end-point device or a user, with the restriction tag being generated based on a request to restrict access by at least one of the end-point device or user to one or more entity users. In various embodiments, the at least one processing device, upon execution of the instructions, is also configured to determine the electronic communication is sent via a spoof network connection.

In another example embodiment, a computer program product for monitoring and restricting electronic communication in a network based on communication characteristics is provided. The computer program product includes at least one non-transitory computer-readable medium having computer-readable program code portions embodied therein. The computer-readable program code portions include an executable portion configured to receive an electronic communication from an end-point device. The computer-readable program code portions also include an executable portion configured to identify a potential user identity associated with the electronic communication. The potential user identity is based on one or more user identifiers associated with the electronic communication. The computer-readable program code portions further include an executable portion configured to determine one or more restriction tags relating to the potential user identity. Each of the one or more restriction tags include a restriction to communication between the end-point device and one or more entity users. The computer-readable program code portions still further include an executable portion configured to cause a restriction action to be executed based on determining the potential user identity has one or more restriction tags. The restriction action is at least one of a restriction notification or a communication restriction to communication with the end-point device.

In various embodiments, the one or more user identifiers include at least one of phone number, end-point device identifier, account identifier, or network information of the end-point device. In various embodiments, the one or more user identifiers include physical characteristics of the electronic communication, and the potential user identity is determined at least in part based on the physical characteristics of the electronic communication.

In various embodiments, the restriction notification is received by an entity end-point device that received the electronic communication and the restriction notification indicates the one or more entity users associated with the one or more restriction tags. In various embodiments, the computer program product further includes an executable portion configured to route the end-point device to a mimic end-point device with the mimic end-point device being configured to impersonate at least one of the one or more entity users associated with the one or more restriction tags.

In various embodiments, the computer program product further includes an executable portion configured to generate a restriction tag to be associated with at least one of an end-point device or a user with the restriction tag being generated based on a request to restrict access by at least one of the end-point device or user to one or more entity users. In various embodiments, the computer program product further includes an executable portion configured to determine the electronic communication is sent via a spoof network connection.

In still another example embodiment, a computer-implemented method for monitoring and restricting electronic communication in a network based on communication characteristics is provided. The method includes receiving an electronic communication from an end-point device. The method also includes identifying a potential user identity associated with the electronic communication. The potential user identity is based on one or more user identifiers associated with the electronic communication. The method further includes determining one or more restriction tags relating to the potential user identity. Each of the one or more restriction tags include a restriction to communication between the end-point device and one or more entity users. The method still further includes causing a restriction action to be executed based on determining the potential user identity has one or more restriction tags. The restriction action is at least one of a restriction notification or a communication restriction to communication with the end-point device.

In various embodiments, the one or more user identifiers include at least one of phone number, end-point device identifier, account identifier, or network information of the end-point device. In various embodiments, the one or more user identifiers include physical characteristics of the electronic communication, and the potential user identity is determined at least in part based on the physical characteristics of the electronic communication.

In various embodiments, the restriction notification is received by an entity end-point device that received the electronic communication, and the restriction notification indicates the one or more entity users associated with the one or more restriction tags. In various embodiments, the method also includes routing the end-point device to a mimic end-point device. The mimic end-point device is configured to impersonate at least one of the one or more entity users associated with the one or more restriction tags.

In various embodiments, the method further includes generating a restriction tag to be associated with at least one of an end-point device or a user with the restriction tag being generated based on a request to restrict access by at least one of the end-point device or user to one or more entity users. In various embodiments, the method also includes determining the electronic communication is sent via a spoof network connection.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 3 illustrates a process flow for monitoring and restricting electronic communication in a network based on communication characteristics, in accordance with various embodiments of the present disclosure.

DETAILED DESCRIPTION

Figure 1A:
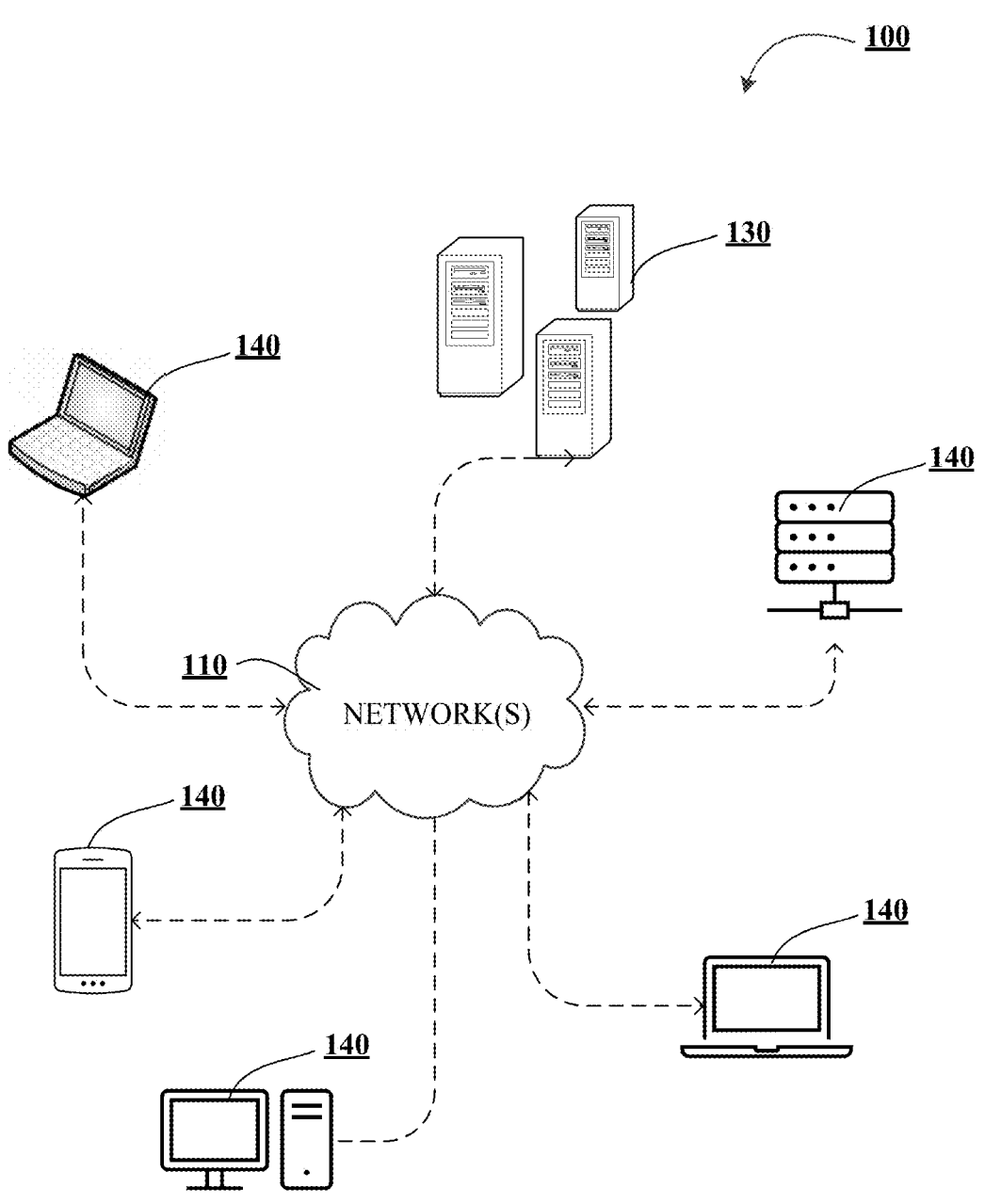
FIGS. 1A-1C illustrates technical components of an exemplary distributed computing environment for monitoring and restricting electronic communication in a network based on communication characteristics, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Limiting calls from certain people or entities may be preferred for a user due to spam activity, threats, and/or various other reasons. However, typical call blocking can be inadequate in multiple ways. Typically, a call block only applies to known phone numbers to a specific user. However, within an entity, such as a company, with multiple individual phone lines or other ways of communicating, it can be difficult to ensure that communicators are not reaching entity users that the communicator is block from communicating. Additionally, typical call blocking does not effectively work when a communicator uses a different form of communication, such as calling from a different phone line. As such, there is a lack of security in communication blocking. Various embodiments of the present disclosure allow for monitoring and restricting electronic communication in a network based on communication characteristics.

Various embodiments of the present disclosure allow for monitoring and restricting electronic communication in a network. The system determines a potential user identity of an electronic communication (e.g., phone call, message, etc.) based on one or more user characteristics, such as phone number, device identifier, account number, and/or the like. Additionally or alternatively, the system may determine the potential user identity based on one or more communication characteristics, such as the voice of a caller, language patterns, etc. Upon determining the potential user identity, the system determines whether the user has any restriction tags, which indicate that the given user is restricted from communication with one or more entity users. The system may then restrict reroute to any of the restricting entity users and/or provide the communication recipient that a restriction tag is associated with the electronic communication. For example, an entity user may receive a restriction notification during a call that the user associated with the call is restricted from speaking with one or more entity users and therefore, the entity user should not transfer the call to any of the restricting entity users.

Figure 1B:
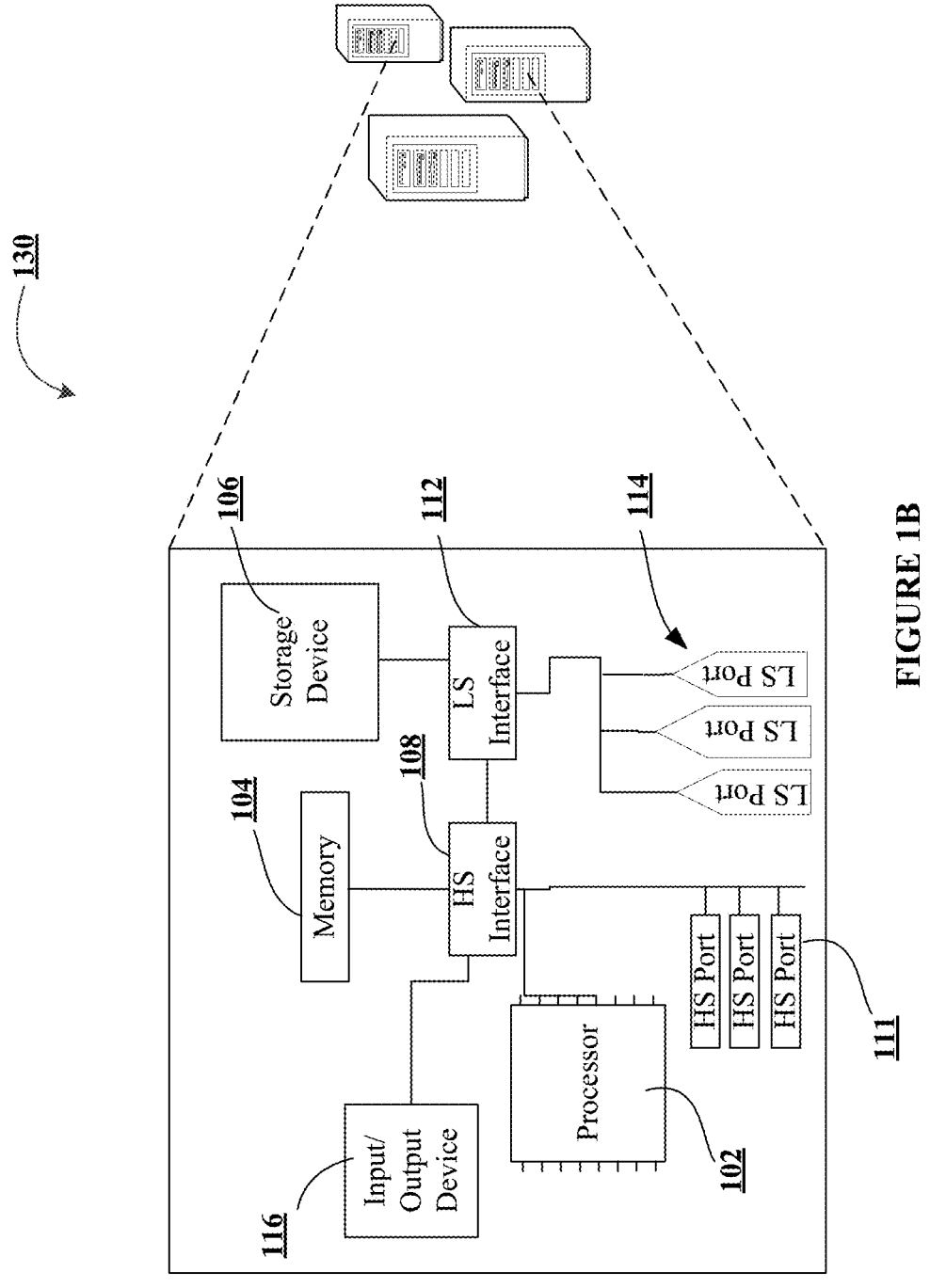
Figure 1C:
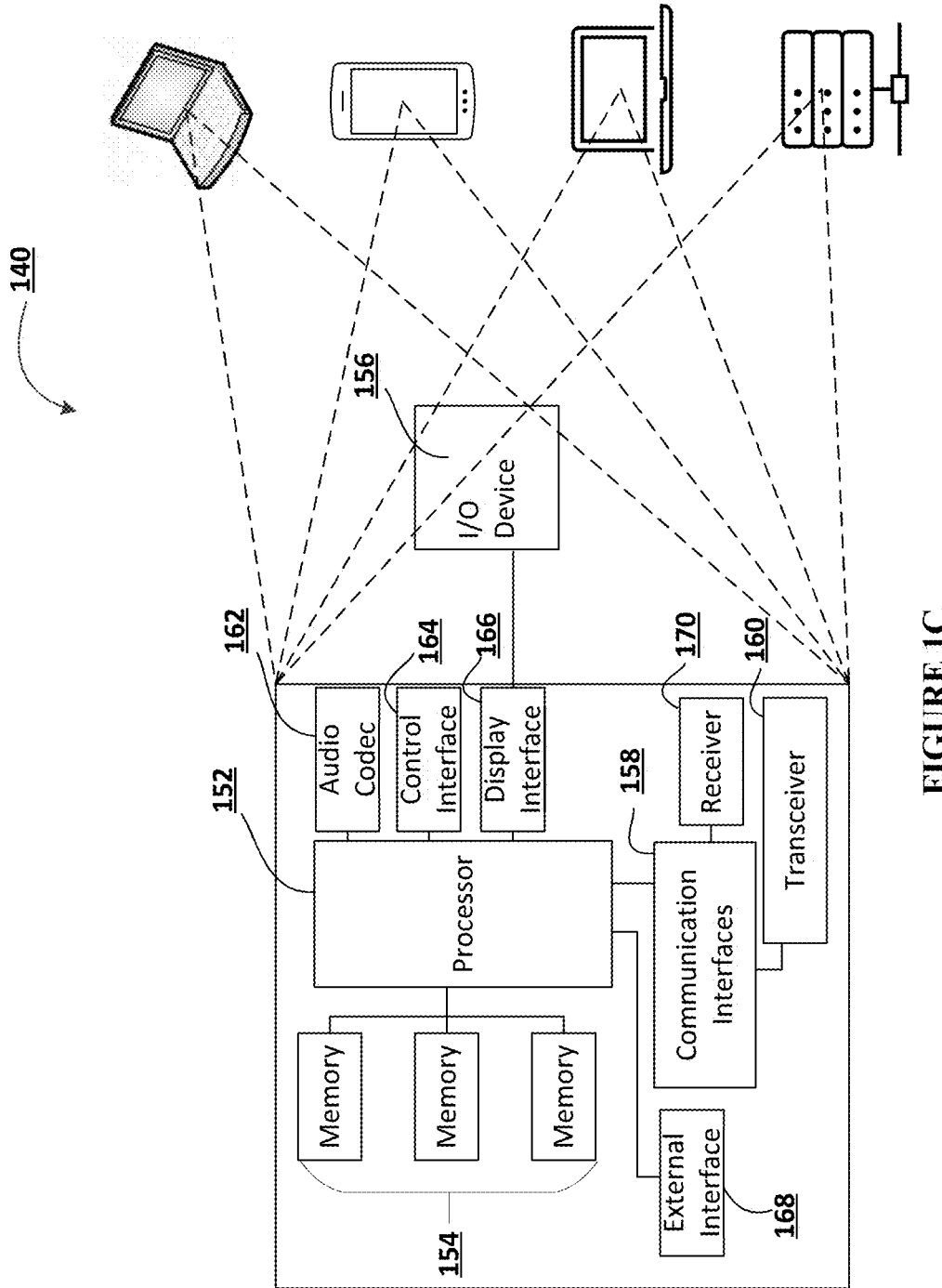

FIGS. 1A-1C illustrate technical components of an exemplary distributed computing environment for monitoring and restricting electronic communication in a network based on communication characteristics, in accordance with various embodiments of the disclosure. As shown in FIG. 1A, the distributed computing environment 100 contemplated herein may include a system 130 (e.g., a malfeasant activity detection device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
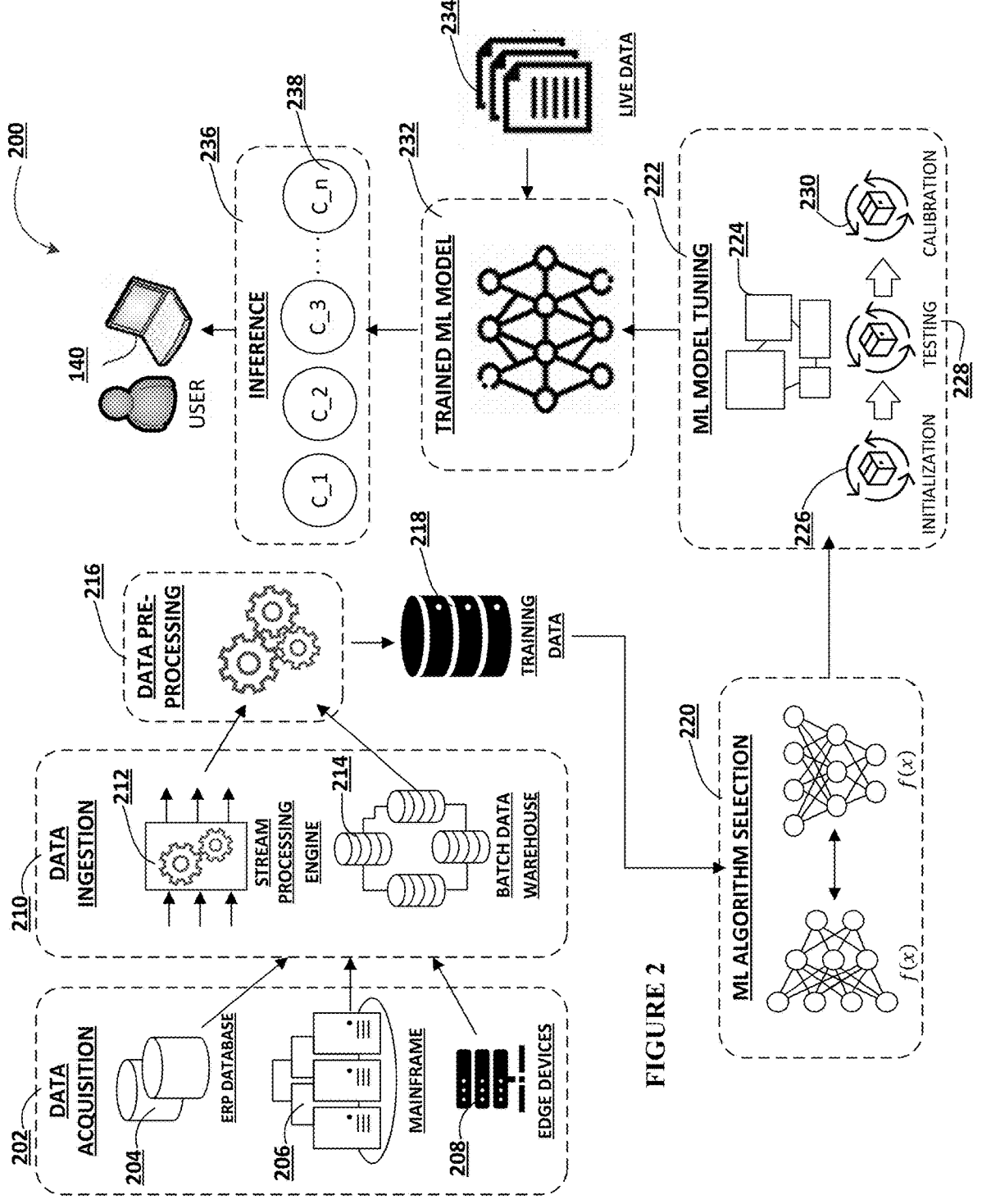
FIG. 2 illustrates an example machine learning (MIL) subsystem architecture used to monitor and restrict electronic communication in a network based on communication characteristics, in accordance with various embodiments of the present disclosure.

FIG. 2 illustrates an example machine learning (ML) subsystem architecture 200, in accordance with an embodiment of the present disclosure. The ML subsystem architecture may be part of the components of the environment 100 (e.g., system 130). The ML subsystem architecture is used to detect and prevent malfeasant activity as discussed below in reference to FIG. 3. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ ... $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ ... $C\_n$ 238) live data 234 based on how similar they are to one another to solve exploratory challenges where little is known about the data, provide a description or label (e.g., $C\_1$, $C\_2$ ... $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is example and that other embodiments may vary. As another example, in some embodiments, the machine learning subsystem 200 may include more, fewer, or different components.

FIG. 3 is a flow chart 300 that illustrates an example method of monitoring and restricting electronic communication in a network based on communication characteristics. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein.

Referring now to optional Block 302 of FIG. 3, the method includes generating a restriction tag to be associated with at least one of an end-point device or a user. The restriction tag is generated based on a request to restrict access for at least one of the end-point device or user to one or more entity users. In various embodiments, an entity user may report a user, end-point device, outside entity, and/or the like, to which the entity user does not want to receive electronic communications. Examples reasons for such restrictions may include spam, threats, and/or the like. In various embodiments, the system may store the restriction tags, such that the restriction tags can be referenced by the system during communications by other entity users (e.g., a coworker may be able to receive information relating to a restriction tag even if the coworker had not directly been told of the reason for such a restriction tag). Additionally or alternatively, restriction types may be autogenerated. For example, spam communications and/or malfeasant communications may be detected using artificial intelligence and tagged as restricted.

In various embodiments, in an instance in which the restriction tag is generated, one or more electronic communications associated with the restriction tag may be stored for use herein. For example, in an instance in which the system determines an electronic communication should be restricted (e.g., via entity user indicating as such or being automatically detected by the system), the electronic communication relating to the restriction tag may be stored. As such, the physical characteristics may be compared to future electronic communications to identify users (e.g., as discussed in reference to FIG. 3 herein).

The restriction tag may include the type of restriction (e.g., one or more entity users the user or end-point device is restricted from communicating), the reason for the restriction (e.g., spam, threat, too many calls, etc.), the length of a restriction (e.g., the restriction tag may last for a certain period of time), recommended restriction actions (e.g., information on who to direct the restricted communicator, such as to directing calls for an executive to the executive's administrative assistant), any dangers relating to the restriction (e.g., the restriction may be due to suspected and/or actual malfeasance), and/or the like.

In various embodiments, the restriction tags may also have time-based components. For example, an entity user may not want any calls from one or more entity users during certain parts of a day (e.g., a purchaser may not want to receive calls from one or more salespeople during a certain part of the day so that the purchaser can complete other duties and as such, one or more salespeople may have a restriction tag for certain periods of time).

In various embodiments, the restriction tags may be location-based. For example, an entity user may not want to receive communications from certain locations (e.g., an executive covering the eastern portion of the United States may not want to receive certain communications from people in the western portion and/or the calls may be directed to the executive covering the western portion of the United States.

Referring now to Block 304 of FIG. 3, the method includes receiving an electronic communication from an end-point device. In various embodiments, the electronic communication may be a telephone call, a message (e.g., instant message, e-mail, text message, etc.), and/or other type of electronic communication. The electronic communication may be from a user associated with the end-point device. The electronic communication may be associated with the user based on actual connection (e.g., a registered end-point device, verified information, etc.) and/or a stated connection (e.g., the user may claim to be the user and/or a representation of the user). The electronic communication may be part of a conversation, verbal and/or textual, between the user and an entity user (e.g., either real or automated). As such, the electronic communication may be multiple individual data packets received from the end-point device. In various embodiments, the electronic communication may include any verbal and/or textual communication delivered from the end-point device associated with the electronic communication. For example, the electronic communication may include the end-point device inputs from a conversation.

The electronic communication may be transmitted via and/or generated by the end-point device. For example, in an instance in which a user is non-synthetic, the user may input the electronic communication (e.g., talk into a phone and/or type out a message) into the end-point device, which transmit the electronic communication via the network as discussed herein. Alternatively, in an instance in which the electronic communication is synthetic (e.g., non-human generated), an end-point device (or other connected processing device) may generate the electronic communication to mimic a user and the end-point device transmits the generated electronic communication.

In various embodiments, the electronic communication may have an actual recipient user and/or an intended recipient user. The actual recipient user is an entity user (or AI system acting as an entity user) that actually receives the electronic communication. For example, the actual recipient user may be an entity user that answered a phone call. In various embodiments, the intended recipient user is the entity user in which the end-point device associated with the electronic communication is attempting to reach (e.g., a caller may ask to speak to another person within a company). In various embodiments, the intended recipient user may be the same as the actual recipient user (e.g., a caller calls a specific entity user directly).

As discussed in reference to Block 306 of FIG. 3 below, the electronic communication may include one or more user identifiers relating to the end-point device and/or the user associated with the electronic communication. For example, the electronic communication may include a telephone number, call identification information, end-point device identifier, account number, call location, etc. The user identifiers may include information from the content of the electronic communication. For example, the voice of a user during the electronic communication may be analyzed to determine the potential user identity.

Referring now to Block 306 of FIG. 3, the method includes identifying a potential user identity associated with the electronic communication. The potential user identity is based on one or more user identifiers associated with the electronic communication. Example user identifiers used to determine the potential user identity include personal information (e.g., name provided, phone number, etc.), end-point device identifier, account identifier, network information of the end-point device, and/or the like.

Additionally or alternatively, the one or more user identifiers used to determine the potential user identity may include physical characteristic(s) of the electronic communication. Physical characteristics of the electronic communications may include speech cadence, speech pattern, speech volume, sequence of communication (e.g., order in which information is provided), and/or the like. In various embodiments, the physical characteristic(s) of the electronic communication may be compared to previous electronic communications with one or more users. For example, one or more electronic communications may be stored and used to compare to the electronic communications to identify potential user identity. Such a comparison and/or analysis may be accomplished using AI and/or machine learning model(s). In various embodiments, the machine learning model(s) discussed above in reference to FIG. 2 may be trained with previous electronic communications with one or more users. For example, electronic communications that are flagged or tagged with restriction tags may be stored and/or otherwise used to train the machine learning model(s) discussed herein.

In various embodiments, the method may include training a machine learning model to determine potential user identity. The machine learning model execution may be carried out by the ML subsystem architecture 200. The machine learning model may include one or more models to process and/or analyze data. The machine learning model may include natural language processing (NLP) and/or artificial intelligence. For example, the system may use the NLP model to scan information provided to the machine learning model to identify recurring patterns relating to verbal and/or textual conversations. The machine learning model may be trained using historical data for the user. The trained machine learning model may be used in various operations discussed herein. The machine learning model may be trained using historical data and/or simulated data. For example, the machine learning model may be trained using data relating to previous conversations with a user (e.g., conversations may be recorded to be used to compare the vocal characteristics of the user to the vocal characteristics of the alleged user discussed herein).

Referring now to Block 308 of FIG. 3, the method includes determining one or more restriction tags relating to the potential user identity. In various embodiments, determining one or more restriction tags relating to the potential user identity includes parsing a restriction database for one or more restriction tags relating to the potential user identity. The parsing of the restriction database may include searching for the name of the potential user, the user identifiers associated with the electronic communication (e.g., the phone number, end-point device identifier, etc.), and/or the like.

As such, the system may determine whether any restriction tags relate to the electronic communication. In an instance in which no restriction tags relate to the electronic communication, no further action may be carried out by the system, such that the actual recipient user may use the transfer network as usual (e.g., to transfer the call to the intended recipient user). In an instance in which the system determines one or more restriction tags apply to the electronic communication, the operations discussed herein may be carried out (e.g., causing an execution of a restriction action, as discussed in reference to Block 312 herein).

Referring now to optional Block 310 of FIG. 3, the method includes determining the electronic communication is sent via a spoof network connection. The electronic communication may be sent via a spoof network connection in any instance in which the one or more user identifiers are attempting to be masked (e.g., a spoofed communication). Examples of spoof communication include masking user voice, IP address and/or other network identifiers, phone number, end-point device identifiers, etc.

Communications that are sent via a spoof network connection may have one or more restrictions applied, such as the restrictions discussed in reference to Block 312 of FIG. 3. For example, an electronic communication that is sent via a spoof network connection may be blocked and/or a message may be provided to the actual recipient user that the electronic communication is suspected to be sent via a spoof network communication. In various embodiments, a spoof rating may also be used to indicate the likelihood of a spoof communication. For example, the system may have a spoof rating of −5 to +5 in which a −5 spoof rating indicates a likely spoof communication and a +5 spoof rating indicates a likely non-spoof communication. In such an example, the spoof rating may be based on the amount of masking included in the electronic communication. For example, a restricted number may be less likely to be a spoof communication than a restricted number with a masked IP address. In various embodiments, the spoof rating may be provided to the entity user (e.g., the actual recipient user).

Referring now to Block 312 of FIG. 3, the method includes causing a restriction action to be executed based on determining the potential user identity has one or more restriction tags. In various embodiments, the restriction action may include a restriction notification and/or a restriction on the end-point device associated with the electronic communication. The restriction action may be based on the restriction tag(s) associated with the user and/or end-point device associated with the electronic communication.

The restriction action may include a restriction notification. The restriction notification may be provided to an entity user (e.g., the actual recipient user) that indicates that a restriction tag exists relating to the user and/or the end-point device associated with the electronic communication. Additional information may be included with the restriction notification, such as the type of restriction (e.g., one or more entity users the user or end-point device is restricted from communicating), the reason for the restriction (e.g., spam, threat, too many calls, etc.), the length of a restriction (e.g., the restriction tag may last for a certain period of time), recommended restriction actions (e.g., information on who to direct the restricted communicator, such as to directing calls for an executive to the executive's administrative assistant), any dangers relating to the restriction (e.g., the restriction may be due to suspected and/or actual malfeasance), and/or the like. In various embodiments, in an instance in which the entity user has a user interface (e.g., an entity user may have a dashboard in which the entity user is able to access account information for users to assist with phone and/or chat support), the restriction notification may be shown on at least a portion of the user interface. For example, the restriction notification may be a pop-up or otherwise visible warning.

In various embodiments, the restriction action may include a restriction on the end-point device associated with the electronic communication. The restriction may include a rerouting block (e.g., an entity user may not be able to transfer the call to one or more entity users indicated by the restriction tag), a rerouting to a mimic device (as discussed in reference to optional Block 314 below), and/or other reduced functionality for the communicator. In an instance in which the restriction action includes a rerouting block, the system may limit the entity user (e.g., the actual recipient user) from transferring the communication to one of the entity users indicated by the restriction tag.

Referring now to optional Block 314 of FIG. 3, the method includes routing the end-point device to a mimic end-point device. The mimic end-point device may be capable of mimicking (e.g., verbally and/or textually) at least one of the one or more entity users associated with the one or more restriction tags. The mimic end-point device may be trained using information provided by the entity user in which the mimic end-point device is mimicking. For example, the system may train an AI machine learning model to produce a mimicked voice or text based on inputs provided by the entity user. Example inputs may be recordings of previous communications, user provided recordings, and/or the like.

In various embodiments, the mimic end-point device may be used to gather information from the end-point device associated with the electronic communication. For example, the system may gather information to be used in subsequent operations discussed herein. Additionally, the mimic end-point device may be capable of answering questions and/or other providing information to the end-point device associated with the electronic communication to allow for the entity user to not be interrupted from other activities.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for monitoring and restricting electronic communication in a network based on communication characteristics, the system comprising:

at least one non-transitory storage device containing instructions; and at least one processing device coupled to the at least one non-transitory storage device, wherein the at least one processing device, upon execution of the instructions, is configured to:

receive an electronic communication from an end-point device;

identify a potential user identity associated with the electronic communication, wherein the potential user identity is based on one or more user identifiers associated with the electronic communication;

generate one or more restriction tags to be associated with at least one of an end-point device or a user, wherein the one or more restriction tags are generated based on a request to restrict access by at least one of the end-point device or user to one or more entity users;

determine the one or more restriction tags relating to the potential user identity, wherein each of the one or more restriction tags comprise a restriction to communication between the end-point device and one or more entity users; and based on determining the potential user identity has one or more restriction tags, cause a restriction action to be executed, wherein the restriction action is at least one of a restriction notification or a communication restriction to communication with the end-point device; and route the end-point device to a mimic end-point device, wherein the mimic end-point device is configured to impersonate at least one of the one or more entity users associated with the one or more restriction tags.

2. The system of claim 1, wherein the one or more user identifiers include at least one of phone number, end-point device identifier, account identifier, or network information of the end-point device.

3. The system of claim 1, wherein the one or more user identifiers include physical characteristics of the electronic communication, wherein the potential user identity is determined at least in part based on the physical characteristics of the electronic communication.

4. The system of claim 1, wherein the restriction notification is received by an entity end-point device that received the electronic communication, and wherein the restriction notification indicates the one or more entity users associated with the one or more restriction tags.

5. The system of claim 1, wherein the at least one processing device, upon execution of the instructions, is configured to determine the electronic communication is sent via a spoof network connection, In various embodiments, the mimic end-point device may be used to gather information from the end-point device associated with the electronic communication, For example, the system may gather information to be used in subsequent operations discussed herein, Additionally, the mimic end-point device may be capable of answering questions and/or other providing information to the end-point device associated with the electronic communication to allow for the entity user to not be interrupted from other activities.

6. A computer program product for monitoring and restricting electronic communication in a network based on communication characteristics, the computer program product comprising at least one non-transitory computer-readable medium having computer-readable program code portions embodied therein, the computer-readable program code portions comprising an executable portion that when executed by at least one processor causes the at least one processor to:

receive an electronic communication from an end-point device;

identify a potential user identity associated with the electronic communication, wherein the potential user identity is based on one or more user identifiers associated with the electronic communication;

generate one or more restriction tags to be associated with at least one of an end-point device or a user, wherein the one or more restriction tags are generated based on a request to restrict access by at least one of the end-point device or user to one or more entity users;

determine one or more restriction tags relating to the potential user identity, wherein each of the one or more restriction tags comprise a restriction to communication between the end-point device and one or more entity users; and cause a restriction action to be executed based on determining the potential user identity has one or more restriction tags, wherein the restriction action is at least one of a restriction notification or a communication restriction to communication with the end-point device; and route the end-point device to a mimic end-point device, wherein the mimic end-point device is configured to impersonate at least one of the one or more entity users associated with the one or more restriction tags.

7. The computer program product of claim 6, wherein the one or more user identifiers include at least one of phone number, end-point device identifier, account identifier, or network information of the end-point device.

8. The computer program product of claim 6, wherein the one or more user identifiers include physical characteristics of the electronic communication, wherein the potential user identity is determined at least in part based on the physical characteristics of the electronic communication.

9. The computer program product of claim 6, wherein the restriction notification is received by an entity end-point device that received the electronic communication, and wherein the restriction notification indicates the one or more entity users associated with the one or more restriction tags.

10. The computer program product of claim 6, wherein the computer program product further comprises an executable portion configured to determine the electronic communication is sent via a spoof network connection.

11. A computer-implemented method for monitoring and restricting electronic communication in a network based on communication characteristics, the method comprising:

receiving an electronic communication from an end-point device;

identifying a potential user identity associated with the electronic communication, wherein the potential user identity is based on one or more user identifiers associated with the electronic communication;

generating one or more restriction tags to be associated with at least one of an end-point device or a user, wherein the one or more restriction tags are generated based on a request to restrict access by at least one of the end-point device or user to one or more entity users;

determining one or more restriction tags relating to the potential user identity, wherein each of the one or more restriction tags comprise a restriction to communication between the end-point device and one or more entity users; and based on determining the potential user identity has one or more restriction tags, causing a restriction action to be executed, wherein the restriction action is at least one of a restriction notification or a communication restriction to communication with the end-point device; and routing the end-point device to a mimic end-point device, wherein the mimic end-point device is configured to impersonate at least one of the one or more entity users associated with the one or more restriction tags.

12. The method of claim 11, wherein the one or more user identifiers include at least one of phone number, end-point device identifier, account identifier, or network information of the end-point device.

13. The method of claim 11, wherein the one or more user identifiers include physical characteristics of the electronic communication, wherein the potential user identity is determined at least in part based on the physical characteristics of the electronic communication.

14. The method of claim 11, wherein the restriction notification is received by an entity end-point device that received the electronic communication, and wherein the restriction notification indicates the one or more entity users associated with the one or more restriction tags.

* * * * *